United States Patent Office 3,012,936
Patented Dec. 12, 1961

3,012,936
ANAESTHETIC COMPOSITION
Willy G. Stoll and Franz Litvan, Basel, Switzerland, assignors to Geigy Chemical Corporation, Ardsley, N.Y., a corporation of Delaware
No Drawing. Filed June 29, 1959, Ser. No. 823,345
Claims priority, application Switzerland July 3, 1958
6 Claims. (Cl. 167—52)

The present invention concerns new aqueous anaesthetic solutions for injection as well as a process for the production thereof.

Compounds of the general formula

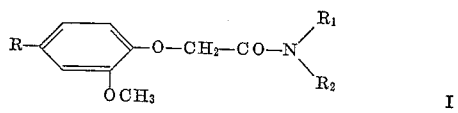

wherein:

R represents a lower alkyl or alkenyl radical, preferably lower alkenyl and preferably allyl, or propen-(1)-yl, $R_1$ represents an alkyl, preferably lower alkyl, alkenyl, preferably lower alkenyl, or cycloalkyl, preferably cyclohexyl, radical or a phenyl or benzyl radical possibly substituted by halogen atoms, preferably chlorine and bromine atoms, lower alkyl or alkoxy groups, $R_2$ represents an alkyl, preferably lower alkyl, or alkenyl radical, preferably lower alkenyl, and the alkyl radicals $R_1$ and $R_2$ may also be bound to each other, have strong anaesthetic activity which starts very quickly after intravenous injection and, depending on the type of the substituents R, $R_1$ and $R_2$, can be of very short or longer duration. Of particular interest for its properties is the compound according to Formula I wherein R represents the allyl radical and $R_1$ and $R_2$ each represent the ethyl radical, i.e. 2-methoxy-4-allyl-phenoxy acetic acid-N.N-diethylamide.

The preparation of aqueous non-injurious solutions of the above anaesthetics is not possible because they are very difficultly soluble in water. Even with the help of known solubility promoters, considerable difficulties are encountered because such large amounts of solubility promoters are necessary that, depending on the type of solubility promoter, too highly viscous or hypertonic solutions are obtained which cannot easily be injected and, in some circumstances, can damage the veins.

Surprisingly it has now been found that aqueous solutions for injection of the active ingredients defined above can be produced which are characterised by a small content of a mixture of selected solubility promoters and which are free from the foregoing adverse effects. Such mixture of selected solubility promoters comprises propylene glycol and sodium benzoate or the sodium salt of a hydroxybenzoic acid. For example, 1–5% solutions of the active substances are produced with the help of at most 40% by volume of propylene glycol and at most 15% of sodium benzoate or the sodium salt of a hydroxybenzoic acid, preferably sodium salicylate. Naturally, if smaller amounts of propylene glycol are used, the amount of the other solubility promoter is increased. For example, to produce 5% solutions according to the invention, 1 part of active substance is dissolved in 4–8 parts by volume of propylene glycol and this solution is increased with 8–20% aqueous sodium benzoate or sodium salicylate solution to 20 parts by volume. Such solutions contain in the end volume 5% of active substance, 20–40% by volume of propylene glycol and 4–15% of sodium benzoate or sodium salicylate.

On using a single solubility promoter, to produce 5% solutions of the active substance, 60–70% aqueous propylene glycol or a 25% sodium benzoate solution would be necessary whereas, according to the invention, for example the necessary amount of propylene glycol can be reduced to 40%, i.e. to two thirds and, at the same time, the necessary amount of sodium benzoate can be reduced to 5%, i.e. to a fifth; if desired, the necessary amount of propylene glycol can be reduced to 20%, i.e. to a third and, at the same time, the necessary amount of sodium benzoate can be reduced to 15%, i.e. to three fifths. In both cases, the amount of both solubility promoters remains within the concentration limits which are tolerated well whilst both 60% propylene glycol as well as 25% sodium benzoate can injure the veins.

Somewhat smaller amounts of sodium salicylate than of sodium benzoate are necessary to produce sufficiently concentrated solutions of the active substance. In addition, for example, the sodium salts of p-hydroxybenzoic acid and of gentisic acid can be used.

Suitable active substances of the general formula I are, for example: 2-methoxy-4-allyl phenoxyacetic acid-dimethylamide, -diethylamide, -di-n-propylamide, -di-n-butylamide, -N-methyl-isopropylamide, -N-methyl-cyclohexylamide, -N-methylanilide, -N-ethyl anilide, -N-n-propyl anilide, -N-n-butyl anilide, -N-n-amyl anilide, -N-n-hexyl anilide, -N-allyl anilide, -N-methyl-p-chloranilide, -N-ethyl-p-chloranilide, -N-n-propyl-p-chloranilide, -N-n-butyl-p-chloranilide, -N-ethyl-p-bromanilide, -N-ethyl-p-anisidide, -N-ethyl-p-toluidide and -N-ethyl-benzylamide; methoxy-4-propene-(1')-yl phenoxy acetic acid- diethylamide; methoxy-4-methyl phenoxyacetic acid diethylamide, 2-methoxy-4-ethyl phenoxy acetic acid diethylamide, 2-methoxy-4-n-propyl phenoxyacetic acid-diethyl amide, -di-n-butylamide and -N-ethyl anilide; 2-methoxy-4-n-butyl phenoxyacetic acid diethylamide; 2-methoxy-4-n-amyl phenoxyacetic acid diethylamide and 2-methoxy-4-n-hexyl phenoxyacetic acid diethylamide.

The following examples further illustrate the production of well tolerated solutions of anaesthetics. Parts are given therein as parts by weight and their relationship to parts by volume is as that of grammes to cubic centimetres.

Example 1

0.5 part of 2-methoxy-4-allyl phenoxy acetic acid-N.N-diethylamide is dissolved, in a measuring flask, in 4 parts by volume of propylene glycol. The solution obtained is diluted with 15% sodium benzoate solution to 10 parts by volume, for which purpose 5.7 parts by volume are necessary. A clear, non-injurious solution for injection is obtained which contains in the end volume 5% of active substance, 40% by volume of propylene glycol and 8.5% of sodium benzoate. Thus, for example 10 ccm. of the end volume contain 0.5 g. of active substance. This solution is ready for injection after sterilisation, e.g. in an autoclave at 120° C. for 20 minutes.

Example 2

0.5 part of 2-methoxy-4-allyl phenoxy acetic acid-N.N-diethylamide is dissolved in 3.5 parts by volume of propylene glycol as described in Example 1 and the solution is made up to 10 parts by volume with 6.2 parts by volume of 15% sodium benzoate solution. The end solution contains 5% active substance, 35% by volume of propylene glycol and 9.3% of sodium benzoate.

Example 3

A solution of 10 parts by volume is produced as described in Example 1 with 0.5 part of 2-methoxy-4-allyl phenoxy acetic acid-N.N-diethylamide, 4 parts by volume of propylene glycol and 5.7 parts by volume of 10% sodium salicylate solution. This solution contains 5% of active substance, 40% by volume of propylene glycol and 5.7% of sodium salicylate.

Example 4

In the same way, a solution of 10 parts by volume is produced with 0.5 part of 2-methoxy-4-n-propyl phenoxy actic acid-N.N-diethylamide, 4 parts by volume of propylene glycol and 5.7 parts by volume of 15% sodium benzoate solution. This solution contains 5% of active substance, 40% by volume of propylene glycol and 8.55% of sodium benzoate.

The other amides mentioned in the description can be used instead of the amides used in Examples 1-4; depending on the solubility of the active substance in propylene glycol, the amount of this solvent can be reduced to 2 parts. If the amount of propylene glycol is reduced, the content of the second component varies between 8 and 20% in the solution to which it is added which corresponds to about 5-15% in the end solution.

What we claim is:

1. An aqueous anaesthetic solution for injection comprising from about 1 to about 5 parts by weight of a compound of the general formula

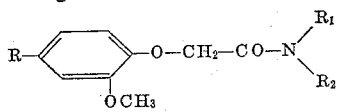

wherein:

R represents a member selected from the group consisting of lower alkyl and lower alkenyl, $R_1$ represents a member selected from the group consisting of lower alkyl, lower alkenyl, cyclohexyl, phenyl, chlorophenyl, bromophenyl, lower alkylphenyl, lower alkoxyphenyl, benzyl, chlorobenzyl, bromobenzyl, lower alkylbenzyl and lower alkoxybenzyl, $R_2$ represents a member selected from the group consisting of lower alkyl and lower alkenyl, and $R_1$ and $R_2$ taken jointly represent a member selected from the group consisting of tetramethylene and pentamethylene radical, a solubility promoter mixture comprising from about 20 to about 40 parts by volume of propylene glycol and from about 4 to about 15 parts by weight of a member selected from the group consisting of sodium benzoate and sodium salicylate, all said parts being based on 100 parts by volume of said solution.

2. An aqueous anaesthetic solution for injection comprising from about 1 to about 5 parts by weight of 2-methoxy-4-allyl phenoxyacetic acid-N.N-diethyl amide, a solubility promoter mixture comprising from about 20 to about 40 parts by volume of propylene glycol and from about 4 to about 15 parts by weight of a member selected from the group consisting of sodium benzoate and sodium salicylate, all said parts being based on 100 parts by volume of said solution.

3. The aqueous anaesthetic solution for injection containing 5% of 2-methoxy-4-allyl phenoxy acetic acid-N.N-diethylamide, 40% by volume of propylene glycol and 8.5% of sodium benzoate.

4. The aqueous anaesthetic solution for injection containing 5% of 2-methoxy-4-allyl phenoxy acetic acid-N.N-diethylamide, 35% by volume of propylene glycol and 9.3% of sodium benzoate.

5. The aqueous anaesthetic solution for injection containing 5% of 2-methoxy-4-allyl phenoxy acetic acid-N.N-diethylamide, 40% by volume of propylene glycol and 5.7% of sodium salicylate.

6. The aqueous anaesthetic solution for injection containing 5% of 2-methoxy-4-n-propyl phenoxy acetic acid-N.N-diethylamide, 40% by volume of propylene glycol and 8.55% of sodium benzoate.

References Cited in the file of this patent

UNITED STATES PATENTS 2,911,440     Thuillier     Nov. 3, 1959

OTHER REFERENCES

Bresser: Pharmazeutische Zentralhalle, vol. 71, No. 29, July 17, 1930, pp. 449-450.

Dow: Drug and Cosmetic Industry, February 1953, advertisement facing p. 200.

Green: Bulletin of the National Formulary Committee, pp. 184-185, vol. xi, Nos. 9-10, September-October 1943.